July 16, 1957     W. C. KELLY     2,799,409
EASY LOADING TRUCK FOR CANS OR THE LIKE
Filed Nov. 23, 1956
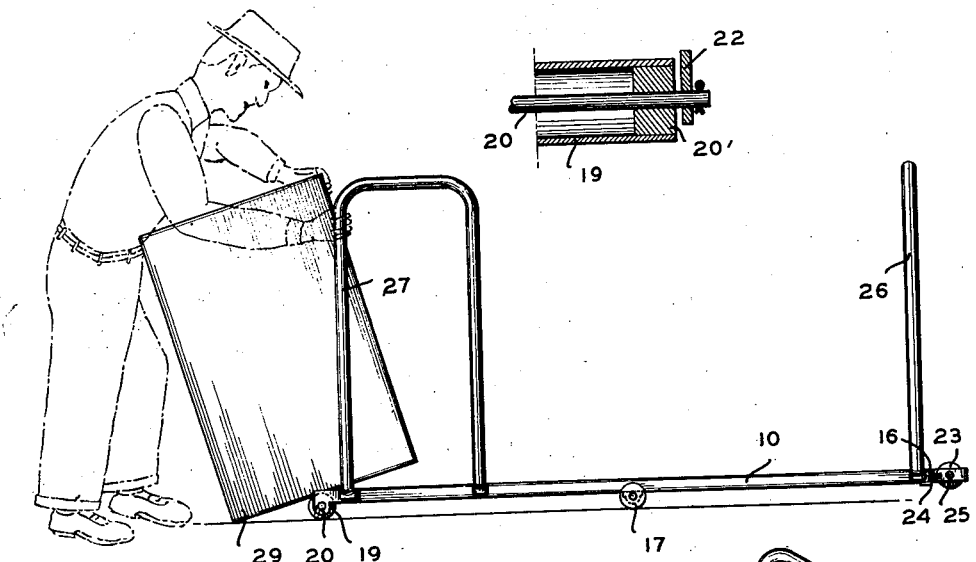
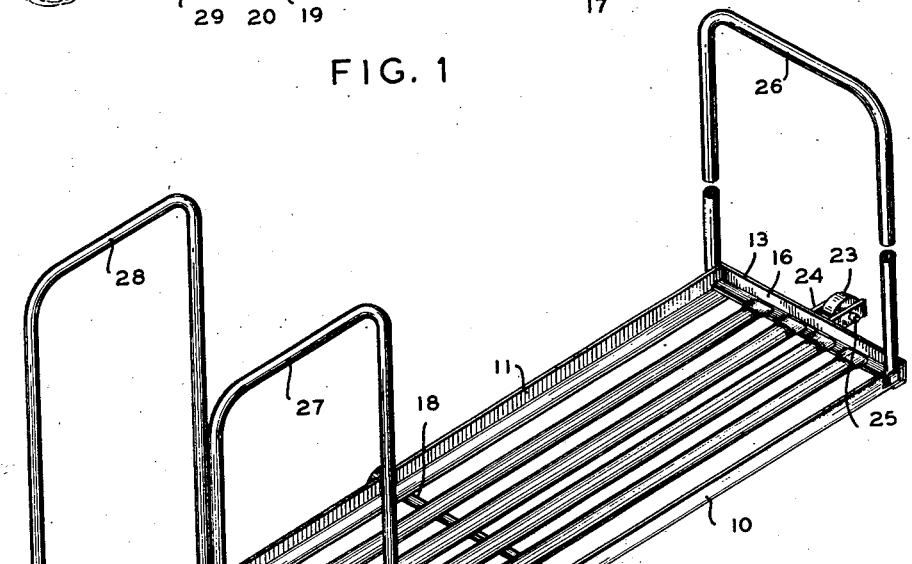
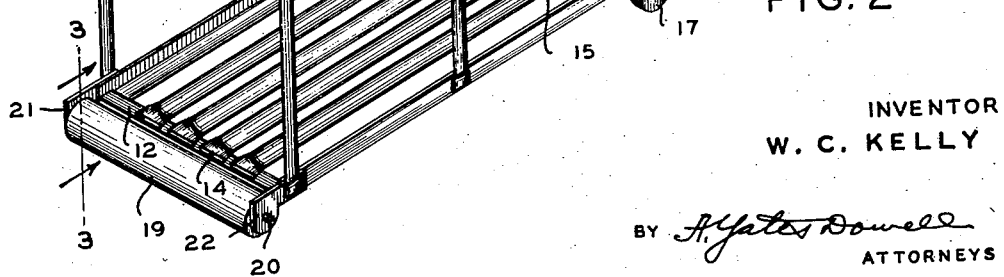
INVENTOR
W. C. KELLY
ATTORNEYS United States Patent Office 2,799,409
Patented July 16, 1957

2,799,409
EASY LOADING TRUCK FOR CANS OR THE LIKE

Wesley Cecil Kelly, Henderson, N. C.

Application November 23, 1956, Serial No. 623,861

5 Claims. (Cl. 214—84)

This invention relates to the handling of commodities of various kinds, sizes and shapes and in various types of packages and containers and to equipment employed in such handling and transportation of the same.

The invention relates more particularly to a wheeled vehicle such as for example an easy loading truck by means of which the loading and transportation of commodities can be accomplished quickly, efficiently, and simply and with the greatest mechanical advantage obtained with minimum effort.

In order to load and transport commodities hand trucks have been provided of various types and sizes. These have been awkward to handle, did not provide the necessary mechanical advantage or were otherwise unsatisfactory and would not adequately serve the purpose for which they were needed, as for example around cotton mills where it is necessary to transport cans or containers of slivers or rovings and for other purposes. Trucks heretofore produced have been clumsy, not of the proper size and character to load and haul cans of any size and of any number so that they would be useful in various plants in which containers are handled and transported.

It is an object of the invention to overcome the difficulties enumerated and to provide a simple and inexpensive truck useful in the handling and transporting of heavy cans or other articles which can be easily and quickly loaded by an operator without assistants with a minimum of effort and by which a relatively heavy load can be transported easily.

Another object of the invention is to provide a truck having a pair of upstanding frames one on each side adjacent the end of the truck capable of being loaded by placing the object between the end of the truck and the operator, tilting the object toward the operator and pulling the truck by such frames toward the operator until the roller on the back of the truck comes in contact with the object to be loaded, then by moving the truck forwardly the roller will roll the object onto the bed of the truck.

Other objects and advantages of the invention will be apparent from the following description taken in conjunction with the accompanying drawing wherein:

Fig. 1 is a side elevation illustrating one application of the invention and the process of loading the same.

Fig. 2, a perspective of the invention; and

Fig. 3, a fragmentary detail on the line 3—3 of Fig. 2.

With continued reference to the drawing, the truck of the present invention comprises a frame having a pair of side members 10 and 11 and end members 12 and 13 all of which may be of angle iron or other appropriate construction.

The end members 12 and 13 preferably for strength are of L-shape construction, the end member 12 having its vertical portion extended downwardly and having its horizontal portions supporting the flattened ends 14 of a series of pipes 15, the opposite flat ends 16 of which are attached to the horizontal portion of the end pipes are attached to the horizontal portion of the end member 13, the upright portion of which extends upwardly. The pipes 15 have their flattened ends welded or otherwise attached to the end members 12 and 13 to provide a rigid body or deck on which objects to be transported are adapted to be loaded and the flattened ends of the pipes facilitate such loading and unloading.

The body or deck formed by the side and end members and the pipes with flattened ends is supported by a pair of wheels 17, one at each end of a centrally disposed axle 18 across the truck slightly nearer the right hand end of the body as shown in Fig. 1 so that the weight will be on such end of the body and in order to support weight and to facilitate loading a roller 19 is mounted parallel to the end of the body by bearings 20' on an axle or shaft 20 by brackets 21 and 22, such brackets being attached to the side members 10 and 11 by welding or any other desired manner.

At its opposite end the truck is provided with a roller 23 mounted in a bracket 24 by means of an axle or spindle 25. As will be apparent from Fig. 1, the lower surface of the roller 23 is located slightly above the plane of the corresponding surfaces of the rollers 17 and 19 so that the body of the truck may pivot on the rollers 17 but the load will be supported by the rollers 17 and 19. An end bracket of U-shaped construction 26 has its ends welded or otherwise secured one to each of the side members 10 and 11 at the front end of the truck while at the opposite end of the truck adjacent the roller 19 are mounted similar brackets 27 and 28, secured at right angles to the transverse bracket 26, each bracket 27 and 28 being welded or otherwise secured to the side members 10 and 11.

It will be apparent from the foregoing that a simple inexpensive truck is provided requiring only a single operator and which will provide the greatest mechanical advantage and facility in the loading and unloading of commodities.

As is apparent from Fig. 1, a can 29 or other object to be loaded on the truck is placed with the roller 19 adjacent the can. Thereupon the operator gets on the remote side of the can from the truck, tilts the can or other object toward himself, then gripping the frames 27 and 28 pulls the truck toward him until the roller 19 comes in contact with the bottom of the object and the object is rolled onto the bed of the truck merely by rolling the truck forward.

It will be obvious to those skilled in the art that various changes may be made in the invention without departing from the spirit and scope thereof and therefore the invention is not limited by that which is illustrated in the drawing and described in the specification, but only as indicated in the accompanying claims.

I claim:

1. An easy loading truck comprising a hollow substantially rectangular frame, a series of spaced tubular members disposed lengthwise between the sides of said frame and having their ends flattened, said ends being attached to the end members of said frame to provide a supporting deck structure, a roller across one end of said frame of a diameter greater than the vertical dimension of said body and with its upper surface disposed slightly above said body and its lower portion extending below said body to perform the dual function of a rolling support for an object being loaded and for the truck, a pair of U-shaped members attached to the sides of said body adjacent said last mentioned roller and a U-shaped member attached transversely to the remote end of said body, roller means supporting said frame intermediate its ends but slightly nearer said roller, a roller at the opposite end of said frame from first roller, said last mentioned roller being located so that it will not touch a supporting surface until said body is pivoted on said roller means near the midportion of said body.

2. An easy loading truck comprising a substantially rectangular frame, a series of spaced tubular members disposed lengthwise between the sides of said frame and having their ends flattened, said ends being attached to the end members of said frame to provide a body structure, a roller across one end of said frame of a diameter greater than the vertical dimension of said body and with its upper surface disposed slightly above said body and its lower portion extending below said body to perform the dual function of a rolling support for an object being loaded and for the truck, an upright member at each side of said body adjacent said last mentioned roller, an upright end member attached to the remote end of said body, roller means supporting said frame intermediate its ends but slightly nearer said roller, a roller at the opposite end of said frame from said first roller, said last mentioned roller being located out of the plane of said roller and roller means so that it will not touch a supporting surface until said body is pivoted on said roller means.

3. An easy loading truck comprising a hollow substantially rectangular frame, a series of spaced members disposed lengthwise between the sides of said frame and having their ends attached to the ends of said frame and providing a supporting deck structure, a bracket attached transversely adjacent each end of said frame, a first roller across one end of said frame, said first roller being of a diameter greater than the vertical dimension of said frame and with its upper surface located slightly below said frame to perform the dual function of a rolling support for said truck and for an object being loaded, a second roller supporting said frame intermediate its ends but slightly nearer said first roller, a third roller at the opposite end of said frame from first roller, said last mentioned roller being located so that it will not touch a flat surface on which said truck is supported until said body is pivoted on said second roller.

4. An easy loading truck comprising an elongated body, a first roller across one end of said body of a diameter greater than the vertical dimension of the latter with the upper surface of said roller located above said body and the lower surface of said roller located below said body so that roller performs the dual function of a rolling support for said body and for an object being loaded onto said body, a second roller supporting said body across its mid-portion, a third roller at the opposite end of said body from the first roller and located above the plane of the lower surface of said first and second rollers so that it will not touch a flat surface on which said truck is supported until said body is pivoted on said second roller.

5. An easy loading truck comprising an elongated body, a first roller across one end of said body of a diameter greater than the vertical dimension of the latter with the upper surface of said roller located above said body and the lower surface of said roller located below said body so that said roller performs the dual function of a rolling support for said body and for an object being loaded onto said body, and a second roller supporting said body across its mid-portion.

References Cited in the file of this patent

UNITED STATES PATENTS

| | | |
|---|---|---|
| 105,564 | Gilson | July 19, 1870 |
| 361,477 | Anderson | Apr. 19, 1887 |
| 1,425,727 | Wallstrom | Aug. 15, 1922 |
| 2,534,868 | Johnston | Dec. 19, 1950 |